United States Patent
Zhodzishsky et al.

(10) Patent No.: US 7,848,293 B2
(45) Date of Patent: Dec. 7, 2010

(54) SYSTEM AND METHOD FOR AUTOMATIC WIRELESS TRANSPORT SELECTION FOR INCREASED PERFORMANCE AND REDUCED POWER CONSUMPTION

(75) Inventors: Victor Zhodzishsky, North Potomac, MD (US); Ash Kapur, Frederick, MD (US)

(73) Assignee: Broadcom Corporation, Irvine, CA (US)

( * ) Notice: Subject to any disclaimer, the term of this patent is extended or adjusted under 35 U.S.C. 154(b) by 663 days.

(21) Appl. No.: 11/746,618

(22) Filed: May 9, 2007

(65) Prior Publication Data

US 2008/0279129 A1    Nov. 13, 2008

(51) Int. Cl.
*G08C 17/00* (2006.01)

(52) U.S. Cl. .................. 370/331; 370/335; 455/574; 709/230

(58) Field of Classification Search .......... None
See application file for complete search history.

(56) References Cited

U.S. PATENT DOCUMENTS

2005/0176473 A1* 8/2005 Melpignano ............ 455/574
2005/0286466 A1* 12/2005 Tagg et al. ............... 370/329

OTHER PUBLICATIONS

M. Adda et al., "A Simple Implementation to Roaming Between GPRS and WiFi Networks," IADAT International Conference on Telecommunications and Computer Networks, Spain, Dec. 1-3, 2004.

* cited by examiner

*Primary Examiner*—Phuoc Doan
(74) *Attorney, Agent, or Firm*—Duane S. Kobayashi

(57) ABSTRACT

A system and method for automatic wireless transport selection for increased performance and reduced power consumption. Multiple wireless transport services can appear to a TCP/IP stack as a single adapter. Management of the multiple wireless transport services can be performed below the TCP/IP stack to optimize on criteria such as power consumption and bandwidth.

7 Claims, 4 Drawing Sheets

SYSTEM AND METHOD FOR AUTOMATIC WIRELESS TRANSPORT SELECTION FOR INCREASED PERFORMANCE AND REDUCED POWER CONSUMPTION

BACKGROUND

Field of the Invention

The present invention relates generally to wireless communication and, more particularly, to a system and method for automatic wireless transport selection for increased performance and reduced power consumption.

Introduction

Mobile devices such as portable computers have multiple ways of maintaining network connectivity. This network connectivity is enabled through the use of a network adapter that controls the transmission and receiving of data at the data link layer (Layer 2).

Microcontroller firmware in the network adapter typically handles the Layer 2 functionality, and is supported by driver software in the operating system. The network adapter interfaces with the TCP/IP stack in the operating system, which provides the Layer 3 and 4 protocols. As IP can run over a variety of different data link layers, the process of transmitting packets on a given data link layer and receiving packets from a given data link layer is controlled both in the software device driver for the network adapter, as well as on firmware of the specific devices. In various implementations, the network adapter can be built directly into the system (e.g., LAN on motherboard (LOM) or WiFi), can be plugged into the PCI bus, USB port, PC Card (CardBus) slot, etc.

For mobile devices, wireless connectivity is a key area of functionality. Examples of wireless adapters include WiFi, cellular, and Bluetooth. Wi-Fi wireless adapters provide local area network (LAN) connectivity using IEEE 802.11. Cellular wireless adapters (e.g., broadband cards) enable data transmission over cellular networks, thereby providing the same mobility as mobile phone. Wireless WANs (WWANs), such as that provided by the EDGE and EV-DO offerings, can span several miles, while WiMAX is designed to span 30 miles and more. Finally, Bluetooth adapters provide short-range wireless transmission for a wireless personal area network (WPAN). In one example, Bluetooth can provide up to 2.1 Mbps data transfer within a range of 10 meters (or 100 meters with a power boost).

Mobile devices can be configured to communicate using multiple wireless technologies. For example, a mobile device can be configured to communicate using WiFi and Bluetooth, with one or more of them being available for communication at any particular time. Managing the relative utility of these various wireless transport mechanisms is a key to effective system utilization. What is needed therefore is a mechanism that enables automatic wireless transport selection for increased performance and reduced power consumption.

SUMMARY

A system and/or method for automatic wireless transport selection for increased performance and reduced power consumption, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In modern network environments, mobile devices such as portable computers can have multiple wireless transport options available for communication. At any given time, a mobile device can have one or more wireless transport options such as WiFi, cellular, Bluetooth, etc. that are capable of use. As would be appreciated, each of these wireless transport mechanisms have different strengths and weaknesses relating to different performance criteria such as bandwidth capacity, power output, or the like. Having all of the available transport options connected all the time would clearly lead to a waste of valuable system resources such as power.

Figure 1:
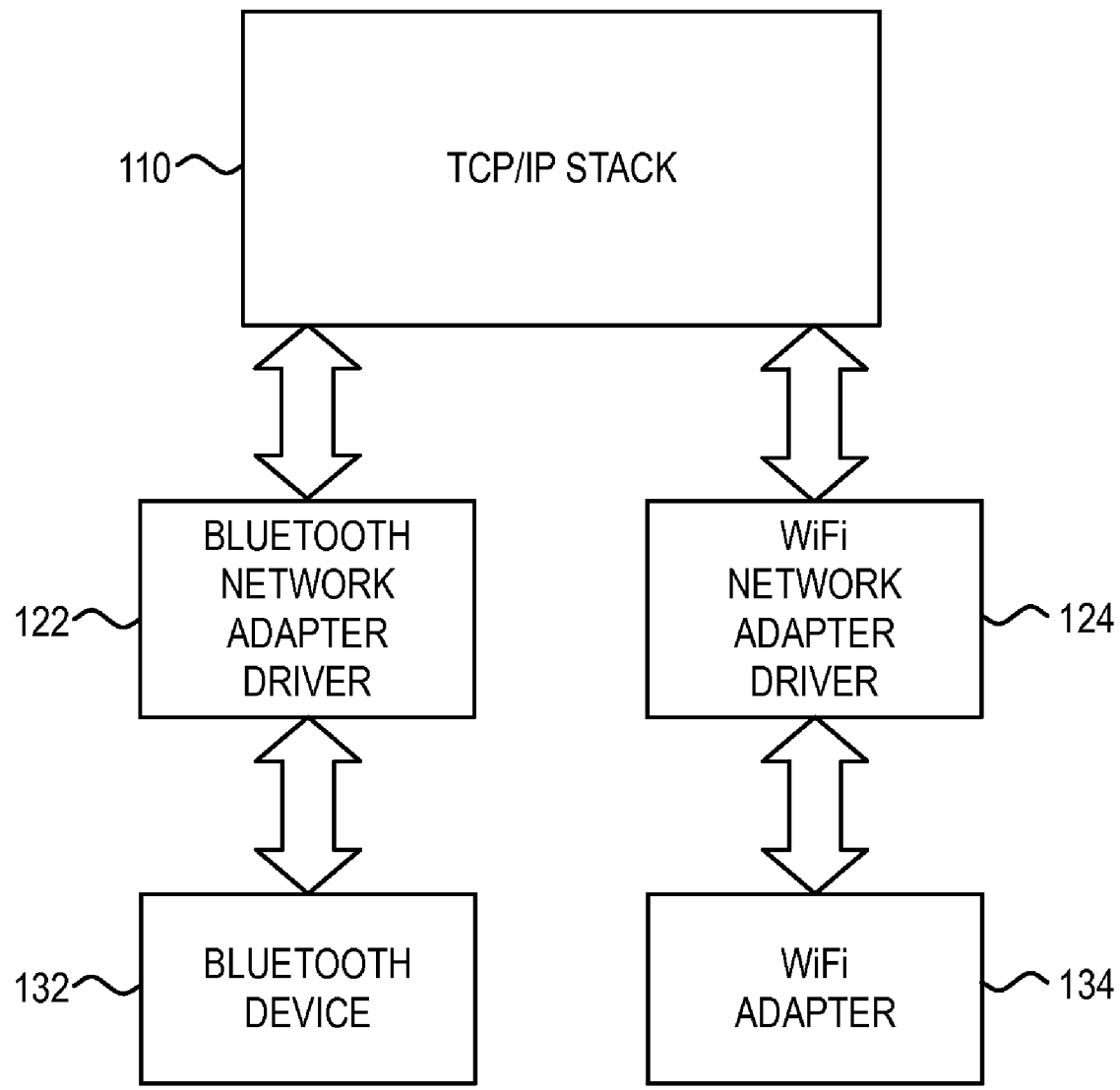
FIG. 1 illustrates a plurality of wireless transport hardware coupled to a TCP/IP stack via separate network adapters.

A conventional wireless transport framework for a host system such as a mobile device is illustrated in FIG. 1. In this example illustration, two wireless transport options are included: Bluetooth and WiFi. While additional wireless transport options such as Zigbee or WiNet could also be included, the Bluetooth and WiFi transport options were chosen simply for illustration purposes.

As illustrated, the Bluetooth and WiFi wireless transport options are supported by transport hardware 132 and 134, respectively. In various embodiments, the individual transport hardware 132, 134 can be built into the host system, or plugged into the host system via PCI, USB, card slot, or the like. Regardless of the method of connection of the transport hardware to the host system, the transport hardware interfaces to TCP/IP stack 110 via a network adapter driver. Specifically, Bluetooth device 132 interfaces with TCP/IP stack 110 via Bluetooth network adapter driver 122, while WiFi adapter 134 interfaces with TCP/IP stack 110 via WiFi network adapter driver 124. In general, each additional transport hardware that is supported by the host system would interface with TCP/IP stack 110 via its own dedicated network adapter driver. Switching between particular transport hardware 132, 134 can be performed manually or through the consideration of high-level preferences (e.g., highest speed connection).

In accordance with the present invention, switching between different transport hardware is based on the consideration of performance parameters, which consideration is performed below the TCP/IP stack. Here, it is a feature of the present inventions that all transport hardware would appear to the TCP/IP stack as a single network adaptor driver. Management of the various transport hardware can then be performed transparently beneath the TCP/IP stack. Thus, while switching between various transport hardware can occur transparently beneath the TCP/IP stack, the TCP/IP stack can remain in a status of being always connected.

For host systems such as mobile devices, a key performance consideration is power. In general, mobile devices must continually make tradeoffs between power and performance of various devices. With respect to various potential wireless transport options, this tradeoff can be illustrated by the Bluetooth and WiFi wireless protocols. The Bluetooth wireless protocol operates at a relatively low data rate and relatively low power as compared to WiFi. A choice between the Bluetooth transport option and WiFi transport option can therefore depend on the relative benefits of power consumption versus bandwidth performance.

For example, consider a situation where TCP/IP traffic is not present or is of low volume. In this operating state, it is more appropriate to use Bluetooth transport, because it will provide enough bandwidth, while maintaining very low power consumption.

Figure 2:
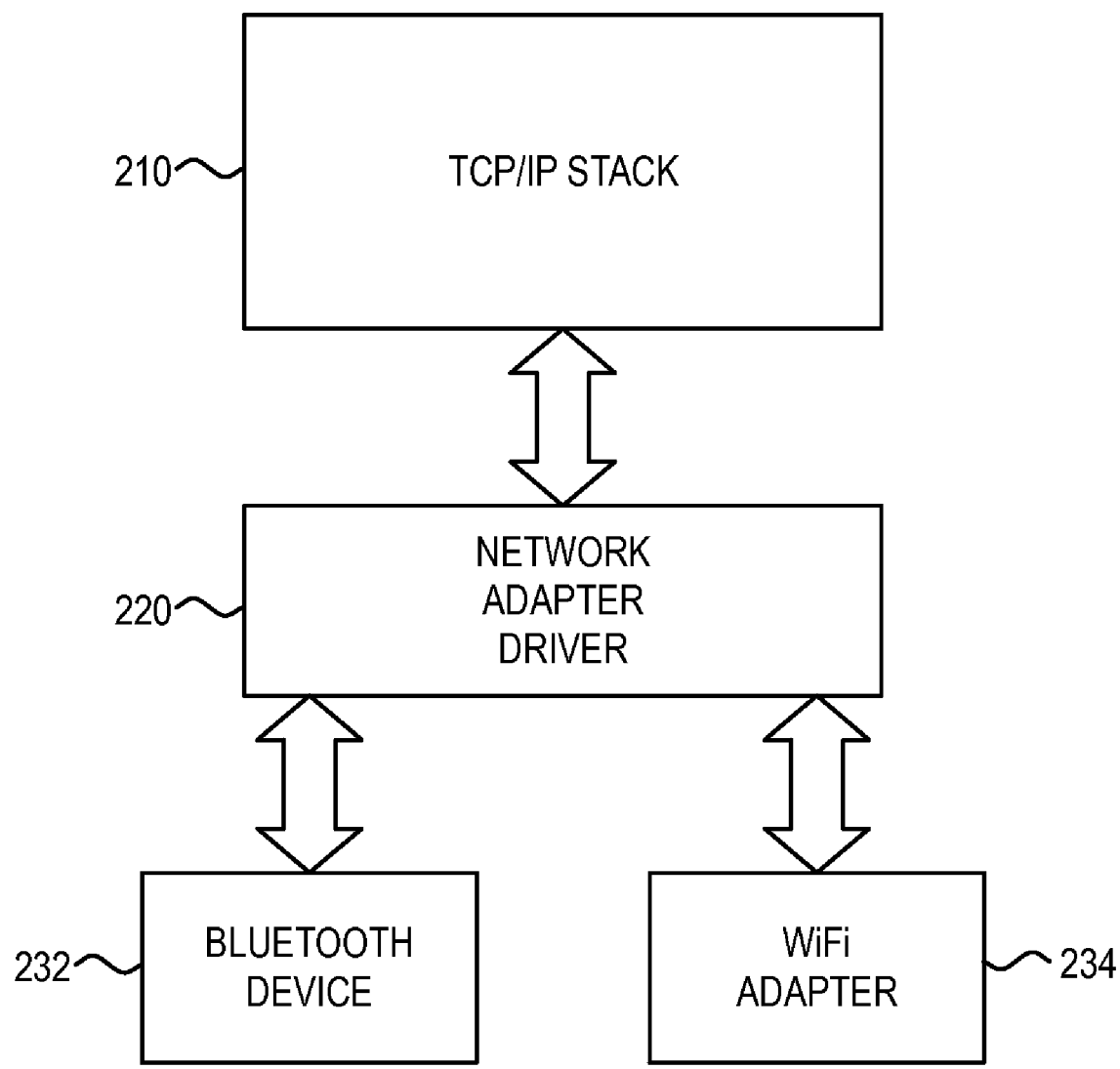
FIG. 2 illustrates an embodiment of a plurality of wireless transport hardware coupled to a TCP/IP stack via a single network adapter.

As TCP/IP traffic levels are typically "bursty," potential tradeoffs between power and bandwidth capacity continually present themselves. FIG. 2 illustrates an embodiment of a transport system that enables real-time balancing of such tradeoffs. As illustrated, two transport options are included, Bluetooth device 232 and WiFi adapter 234. Here, it should be noted that the principles of the present invention can be applied to other types of transport options as well. Both Bluetooth device 232 and WiFi adapter 234 are connected to TCP/IP stack 210 via a single network adapter driver 220. Network adapter driver 220 therefore provides a single interface by TCP/IP stack 210 to multiple transport hardware that are hidden below TCP/IP stack 210.

In accordance with the present invention, network adapter driver 220 is designed to control the relative activation of Bluetooth device 232 and WiFi adapter 234. This relative activation can be based on an analysis of the relative strengths/weaknesses of the transport options in view of various considerations such as traffic levels, quality of service, received signal strength, power state of the host (e.g., battery versus AC powered), quality of connection, interference, battery level, etc.

In one example, the relative activation can be based on required bandwidth. For example, Bluetooth device 232 consumes less power when active as compared to WiFi adapter 234. In this scenario, when TCP/IP traffic is not present or is at a low level, WiFi adapter 234 can be powered off, while Bluetooth device 232 keeps the connection active via a very low power state. When an increase in traffic level is detected (e.g., user starts a file download), then network adapter driver 220 detects the traffic level increase and automatically turns on power for WiFi adapter 234.

In one embodiment, network adapter driver 220 could choose to keep Bluetooth device 232 active when WiFi adapter 234 is activated. In this manner, the lowest power consumption transport hardware would always be active, and other transport hardware would be activated only when the data requirements merit it. In an alternative embodiment, network adapter driver 220 could choose to turn off Bluetooth device 232 when WiFi adapter 234 is activated. This would further conserve consumed power.

In this power/performance optimization, power consumed per bit of transmitted information is kept at a lowest possible level. As would be appreciated, network adapter driver 220 can be configured to manage multiple transport hardware below TCP/IP stack 210 based on various considerations for optimization purposes.

Figure 3:
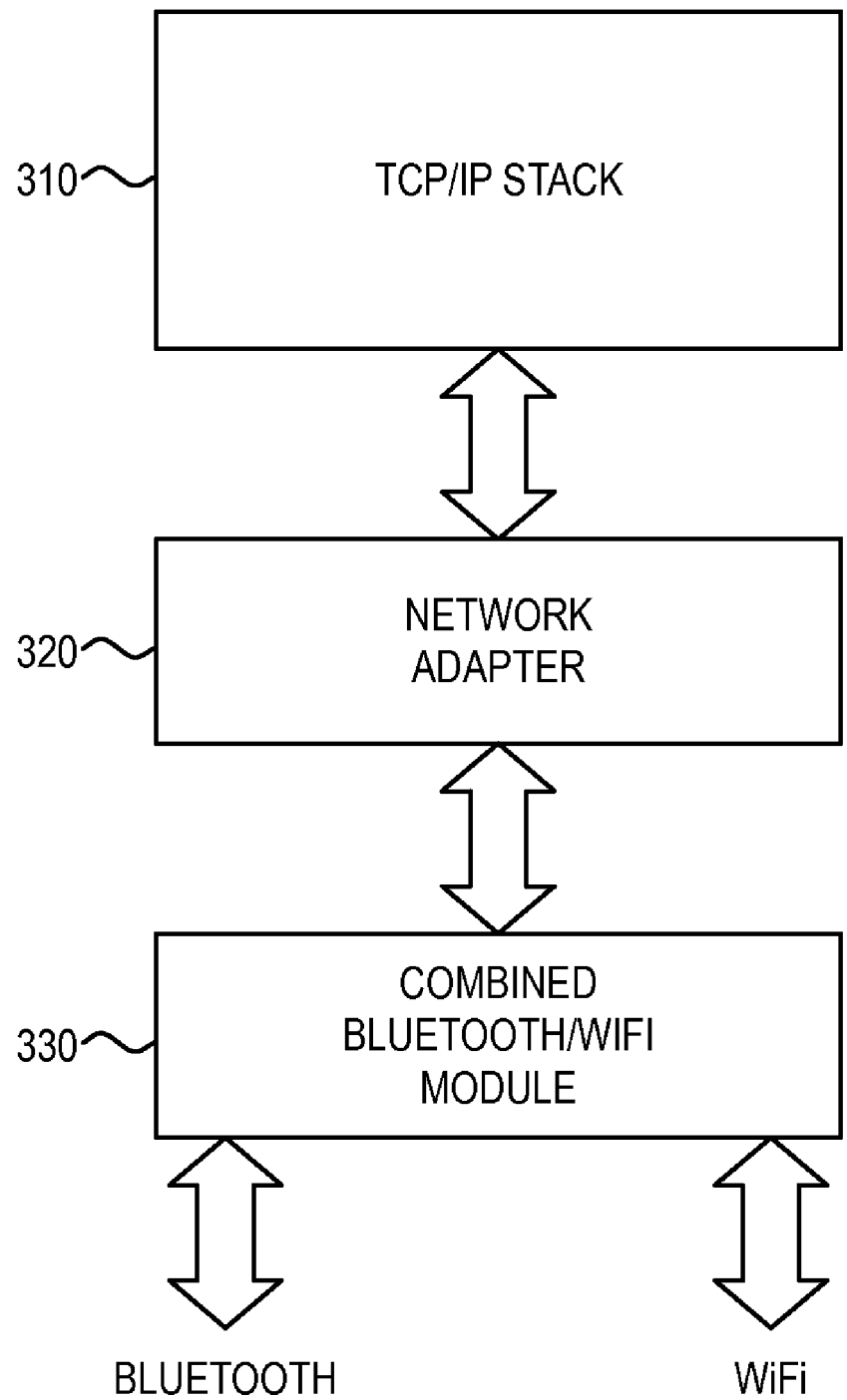
FIG. 3 illustrates another embodiment of a plurality of wireless transport hardware coupled to a TCP/IP stack via a single network adapter.

In the multi-device solution of FIG. 2, network adapter driver 220 controls the relative activation of multiple transport hardware 232, 234. In an alternative embodiment, the intelligence of the driver is embodied within the transport hardware itself. FIG. 3 illustrates such an embodiment, wherein the driver functionality is built into combined transport hardware module 330. As illustrated, combined transport hardware module 330 interfaces with TCP/IP stack 310 via network adapter 320. In this embodiment, combined transport hardware module 330 includes the internal logic that enables the relative activation of Bluetooth and WiFi functionality within the combined transport hardware module 330. Combined transport hardware module 330 is therefore responsible for selecting whether Bluetooth or WiFi traffic is to be routed to/from network adapter 320 for delivery to/from TCP/IP stack 310.

Figure 4:
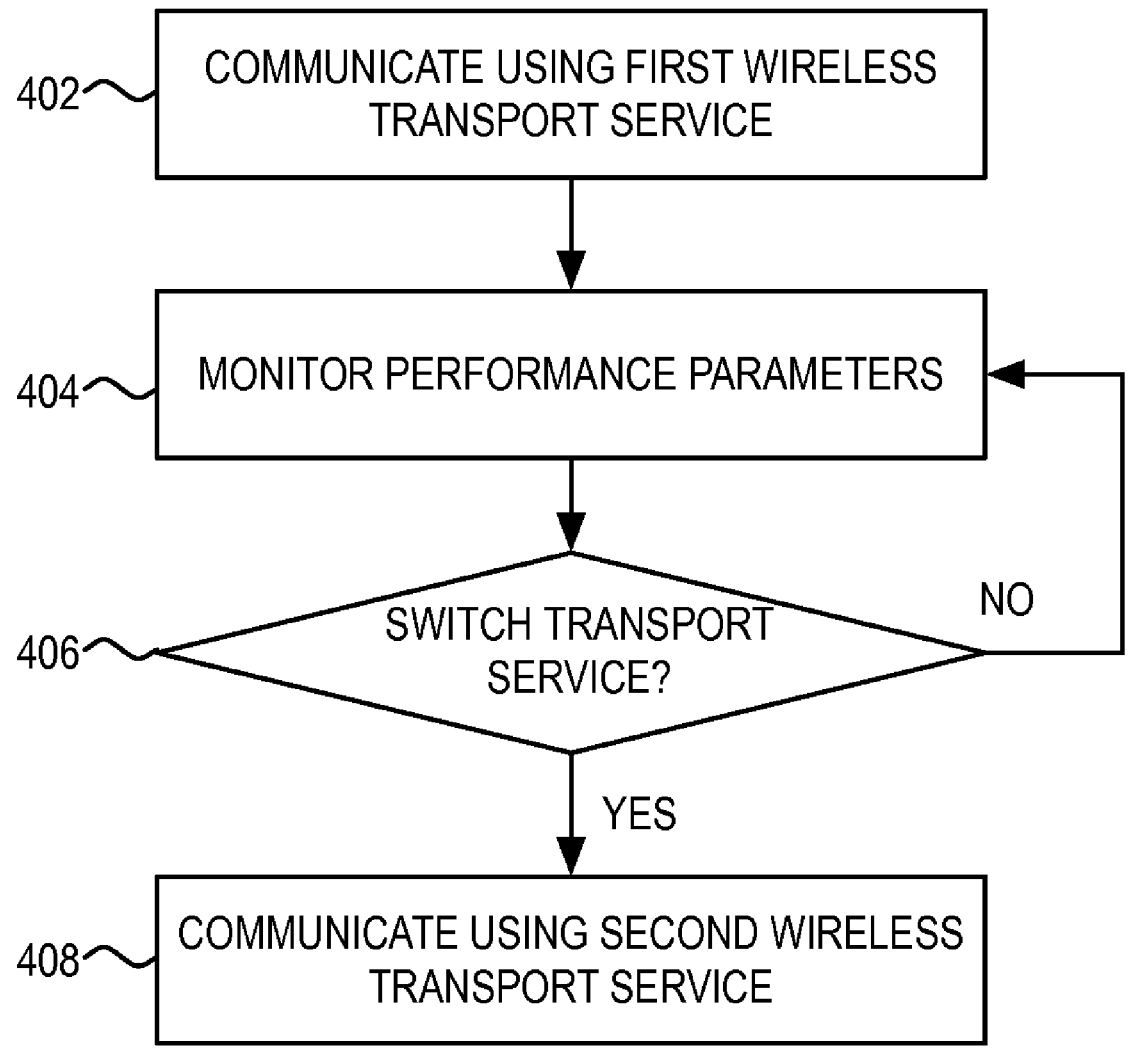
FIG. 4 illustrates a flowchart of a process for automatic wireless transport selection.

To further illustrate the principles of the present invention, reference is now made to the flowchart of FIG. 4. As illustrated, the process begins at step 402 where communication on a mobile platform is provided using a first wireless transport service (e.g., Bluetooth). At this point, the first wireless transport service could represent the optimal transport service for the given set of conditions. For example, if the traffic level is low or the WiFi connection is poor, the first wireless transport service may be a Bluetooth transport service.

Next, at step 404, various performance parameters are monitored. As would be appreciated, the specific set of performance parameters that are monitored would be implementation dependent. In the example noted above, traffic level can be monitored. In other examples, quality of service, received signal strength, interference, etc. can be monitored.

As has been described, the present invention enables the system to automatically select the optimal adapter to be used at any given time. This feature of the present invention eliminates the challenge of having a user or an application take the responsibility of selecting the optimal adapter. As only a single transport is needed at any given time, identification of the optimal adapter is critical to optimization efforts such as conserving power and preserving battery life.

At step 406, the monitored set of performance parameters are then analyzed to determine whether traffic should be switched to another transport service. In general, this analysis is intended to determine whether an alternative transport service would represent a more optimal transport solution. If the analysis at step 406 indicates that the transport service should not be switched, then the process continues to monitor the performance parameters. If, on the other hand, the analysis at step 406 indicates that the transport service should be switched, then the process continues on to step 408 where communication is performed using a second wireless transport service. In general, control of this switching between transport services is performed by some management entity or internal logic. For example, as noted above, control can be effected by a network adapter or transport hardware.

Upon the transition to the second transport service, the first transport service may or may not be powered down. Powering down the first transport service may be performed if the benefits of further conserving power justify the action. More significantly, however, the transition between transport services is performed transparently from the TCP/IP stack point of view. As such, application changes are unnecessary as the functionality is easily portable between platforms.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A wireless transport system, comprising:
a first wireless transport hardware enabling communication under a first wireless protocol;
a second wireless transport hardware enabling communication under a second wireless protocol; and
a computer-readable memory having information processing program code for a network adapter driver, said network adapter driver processing data from said first and second wireless transport hardware for delivery to a TCP/IP stack, said program code including the step of switching between said first wireless transport and said second wireless transport based on an analysis of one of a power state and a battery level of a host system, wherein said first wireless transport hardware and said second wireless transport hardware interface with the host system separately, and wherein said network adapter driver provides a single network adapter interface for said first wireless transport and said second wireless transport.

2. The system of claim 1, wherein said first wireless protocol and said second wireless protocol implement one of WiFi, Bluetooth, WiNet and Zigbee.

3. The system of claim 1, wherein said step of switching is additionally based on one of traffic level, quality of service, received signal strength, quality of connection and interference.

4. A wireless transport method in a host system, comprising:
communicating with a first wireless transport hardware using a first wireless protocol, wherein said first wireless transport hardware is coupled to a network adapter that provides an interface to a TCP/IP stack;
analyzing one of power state and battery level; and
switching, based on said analysis, said communication to a second wireless transport hardware using a second wireless protocol, wherein said second wireless transport hardware is coupled to said network adapter, and wherein said first wireless transport hardware and said second wireless transport hardware have a separate interface to the host system.

5. The method of claim 4, wherein said first wireless protocol and said second wireless protocol are different.

6. The method of claim 5, wherein said first wireless protocol and said second wireless protocol implement one of WiFi, Bluetooth, WiNet and Zigbee.

7. The method of claim 4, wherein said analyzing further comprises analyzing one of traffic level, quality of service, received signal strength, quality of connection and interference.

* * * * *